(12) United States Patent
Lombard

(10) Patent No.: US 6,267,398 B1
(45) Date of Patent: Jul. 31, 2001

(54) MULTI-PURPOSE MOTOR VEHICLE ACCESSORY

(76) Inventor: Ockie Lombard, Plot 5, 7th Avenue, Glen Marais, Gauteng Province (ZA)

( * ) Notice: Subject to any disclaimer, the term of this patent is extended or adjusted under 35 U.S.C. 154(b) by 0 days.

(21) Appl. No.: 09/401,300

(22) Filed: Sep. 23, 1999

(30) Foreign Application Priority Data

Sep. 25, 1998 (ZA) .................................................... 98/8772

(51) Int. Cl.[7] .................................................... B60R 3/00
(52) U.S. Cl. .................................................... 280/163; 14/2.4
(58) Field of Search .................................. 280/163, 164.2, 280/165, 166, 169, 164.1, 154; 296/151; D12/203; 14/2.4, 2.5; 182/119, 92; 108/44, 152

(56) References Cited

U.S. PATENT DOCUMENTS

| 854,329 | 5/1907 | Charron . | |
| 1,289,392 | 12/1918 | Chervictnak . | |
| 1,310,973 | 7/1919 | Von Schrenk . | |
| 1,366,570 | * 1/1921 | La Croix et al. | 280/169 |
| 1,732,994 | * 10/1929 | Spiro | 280/163 |
| 2,141,529 | 12/1938 | Gravelle . | |
| 3,140,891 | * 7/1964 | Shreffler | 280/163 |
| 3,774,952 | * 11/1973 | Zorn | 280/169 |
| 4,462,486 | * 7/1984 | Dignan | 280/166 |
| 5,193,829 | * 3/1993 | Holloway et al. | 280/163 |
| 5,286,049 | * 2/1994 | Khan | 280/163 |
| 5,697,626 | * 12/1997 | McDaniel et al. | 280/166 |
| 5,895,064 | * 4/1999 | Labuch | 280/163 |

* cited by examiner

*Primary Examiner*—Daniel G. DePumpo
*Assistant Examiner*—Christopher Bottorff
(74) *Attorney, Agent, or Firm*—Banner & Witcoff, Ltd.

(57) ABSTRACT

A removable multipurpose running board assembly for a motor vehicle wherein the running board is of extruded material provided with a pair of transverse sockets to receive support pins. A pair of clamps securable to the vehicle provide anchor ports to which the support pins are mounted to removably retain a running board in position when the support pins are located in the sockets.

8 Claims, 3 Drawing Sheets

MULTI-PURPOSE MOTOR VEHICLE ACCESSORY

FIELD OF THE INVENTION

This invention relates to a multi-purpose motor vehicle accessory and more particularly to a vehicle running board which is removable from the vehicle for other purposes.

BACKGROUND TO THE INVENTION

Vehicle running boards are mainly confined to use with delivery vehicles, recreational or construction vehicles used on a wide range of road surfaces. This use is arduous and often involves driving in mud and sand and over ditches or trenches where the vehicle can easily become trapped. Most running boards are restricted in use to access in and out of vehicles and to add to the appearance of the vehicle.

OBJECT OF THE INVENTION

It is the object of this invention to provide a running board assembly which will enable the running board to be easily accessible for purposes other than a step board for entry into the vehicle.

SUMMARY OF THE INVENTION

According to this invention there is provided a running board assembly comprising a running board, at least one clamp to engage a vehicle chassis member, a support pin mounted on the damp to pivot parallel the running board, the pin engageable in a socket in the running board transverse to the length thereof and means for retaining the pin in the running board.

The invention also provides for there to be a pair of pins and brackets, for there to be means restricting the pivotal movement of the pins to provide terminal positions of the pins relative to the chassis and for the pins to be releasably engaged with the clamp.

The invention further provides for the running board to be extruded from suitable aluminium composition, for the extrusion to be hollow with reinforcing webs, for the ends to be tapered inwardly and closed by plates adhesively secured in position and for the upper and lower surfaces of the running board to be provided with longitudinally extending grooves V-shaped in cross-section. Still further features of this invention provide for the running board to include sockets transverse to the thickness of the board shaped to receive the ends of supporting members and for the pins to be braced against bending.

BRIEF DESCRIPTION OF THE DRAWINGS

These and other features of this invention will become apparent from the following description of a preferred embodiment. Reference will be made to the accompanying drawings in which.

DETAILED DESCRIPTION WITH REFERENCE TO THE DRAWINGS

Figure 1:
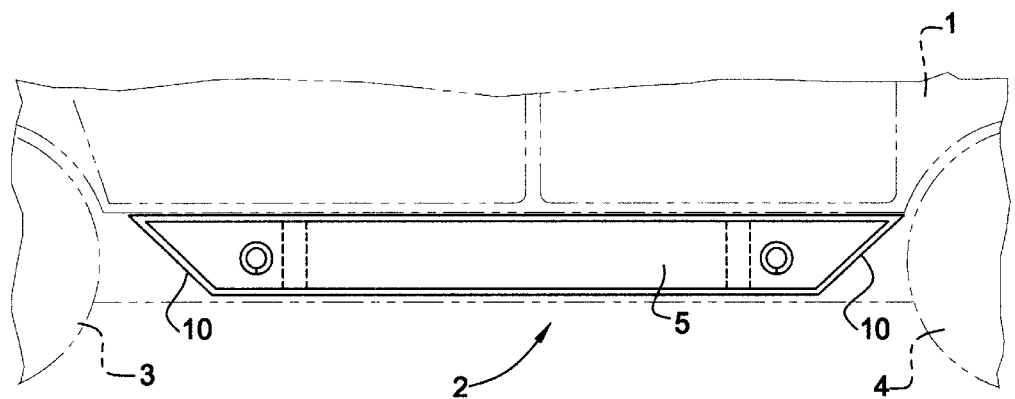
FIG. 1 is a side view of the running board assembly.
Figure 2:
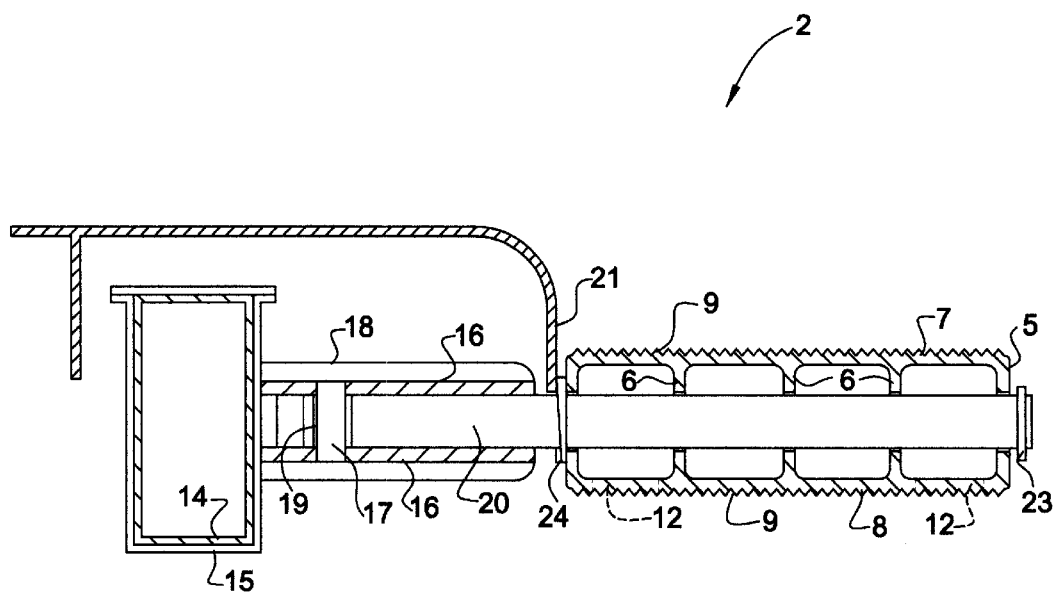
FIG. 2 is a cross-section of the assembly.
Figure 3:
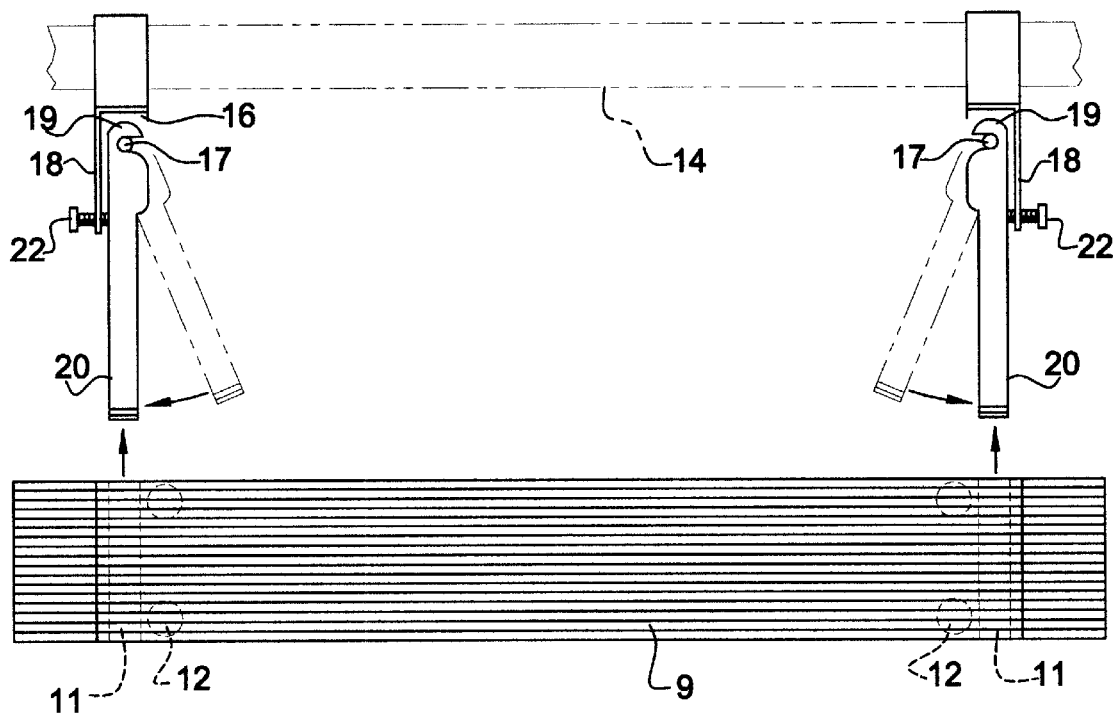
FIGS. 3 to 6 show details.

As illustrated a motor vehicle is indicated in dotted lines at (1). A running board assembly (2) is fitted to the vehicle (1) between the front and back wheels (3) and (4). An assembly (2) is fitted to each side of the vehicle.

Each running board (5) is formed from suitable extruded aluminium. (See FIG. 4). The extrusion has internal reinforcing webs (6) and the upper and lower surfaces (7) and (8) have longitudinally extending grooves (9) formed therein. These grooves are V-shaped in cross-section.

The ends of the running boards (5) are tapered and the openings thus formed in the extrusion are closed by plates (10) of similar material. The plates are secured with suitable synthetic resin bonding material. Other means for retaining the plates (10) such as suitable dips or welding for example may be used.

The end plates (10) are also preferably provided with V-shaped grooves (9). The tapered ends provide outwardly directed pointed edges along what is the upper side of the running board when the latter is in position on the vehicle (1).

A pair of sockets (11) are provided to extend through the width of the running boards (5). Also sockets indicated at (12) adjacent the ends of the running board extend upwardly into the thickness of the boards (5).

A pair of clamping brackets (15) are provided and shaped and sized to clamp around a longitudinal chassis member (14). The brackets (15) may be U-shaped with a closure plate bolted across the free ends of the flanges of the U-section. Alternatively oppositely directed angle-sectioned members may be bolted together to clamp against the chassis member. Also it is to be understood that for vehicles which do not have appropriate chassis members alternative clamping arrangements will be provided to carry the anchor post (18) and pin (20) referred to below.

A U-sectioned channel (16) projects from each clamp and each channel carries between the flanges an upright anchor post (17). The channels (16) are preferably braced by a plate (18) extending beyond the width of the channel web.

A hooked end (19) to a pin (20) is engaged around each post (17) so that the pins (20) may pivot about the anchor posts (17) between positions parallel to the chassis member (14) and positions at right angles thereto. In the latter position the pins (20) project outwardly from the chassis and extend beyond the side (21) of the vehicle (1).

With the pins (20) parallel to the chassis they may be easily removed from the anchor posts (17) but when projecting from the chassis they are held secure by the hooked ends (19).

Suitable adjusting stops (22) will preferably be provided to extend through the webs of the channels (16) to locate the pins (20) accurately in the projecting positions.

With the pins (20) projecting from the chassis the running board sockets (11) can be located over the pins (20) and the running board (5) will then be supported in its normal position. Any convenient means indicated at (23) can be used to ensure that the running board (5) will not be unintentionally removed from the pins (20) and springloading (24) will be included to provide resilience to the running board mounting.

It will be appreciated that the running boards (5) can be easily removed from the pins (20) when required as an alternative accessory to the vehicle (1).

Figure 4:
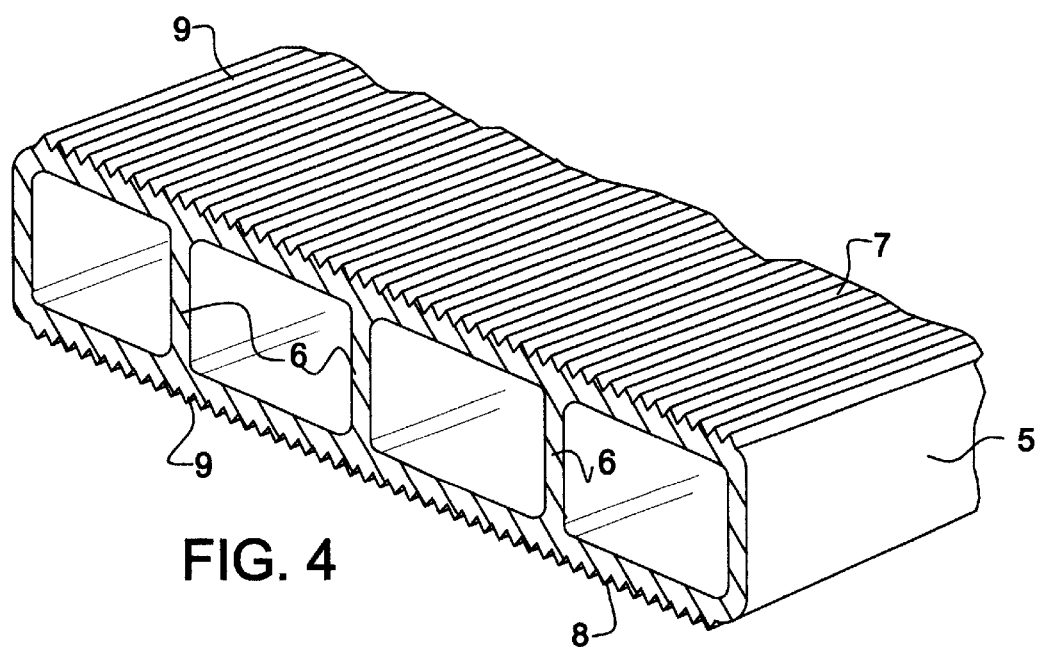
Figure 5:
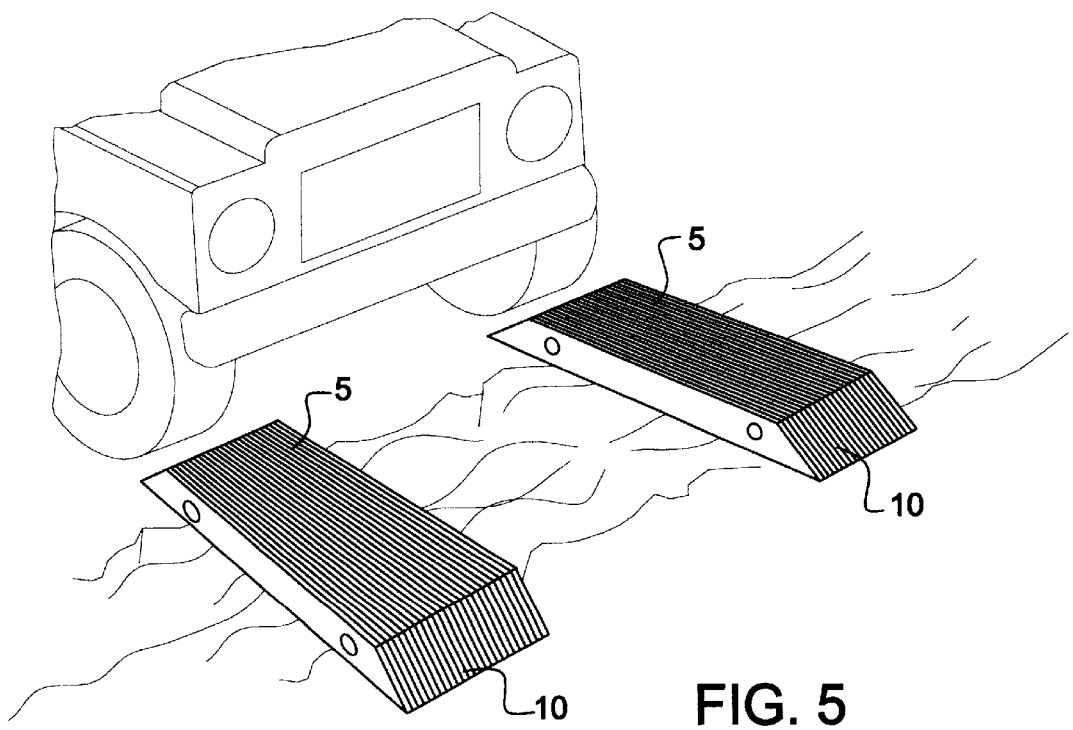

As shown in FIG. 5 both running boards (5) have been removed and placed in front of the vehicle to act as a bridge over a ditch. For this purpose the extruded and reinforced construction shown in FIG. 4 gives the running board both adequate strength and light weight. The shape of the grooves (9) results in an added material advantage in that traction between tires and running board is maintained as sand and mud does not readily pack into the V-shaped cross section of the grooves.

The tapered ends to the running boards form ramps which facilitate the vehicle mounting the running boards when they are used as ladders to bridge areas of sand or mud or across trenches.

Figure 6:
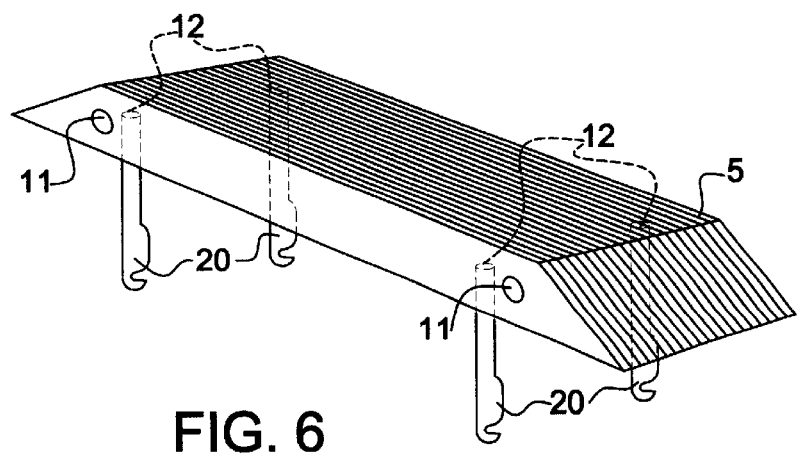

FIG. 6 illustrates the use of the running board as a table or bench. Pins (20) removed from the anchor posts (17) are inserted into the sockets (12) to hold the running board above ground level as indicated. Other pins or supports can be used for this purpose.

It will be understood that, while the length of pins (20) may have to be custom made along with the brackets, a standard running board can be produced which can be used as above described for a wide range of vehicles for the purposes set forth.

The invention provides a simple robust cons on which can be easily and quickly changed from one accessory to another without great skill and a minimum tool requirement.

What I claim as new and desire to secure by Letters Patent is:

1. A multi purpose running board assembly comprising a running board extruded from aluminum to a hollow section reinforced by ribs and having a pair of sockets extending through a width thereof, a pair of clamps securable to a vehicle with each clamp providing an anchor post for a support pin mounted thereon and engageable in a respective socket to locate the running board at a location on the vehicle, the support pins being pivotable parallel to the location for the running board and means for releasably retaining each support pin in a respective socket.

2. A motor vehicle running board assembly as claimed in claim 1 in which the clamps are each securable to a chassis member of the vehicle.

3. A motor vehicle running board assembly as claimed in claim 1 in which the clamps include means restricting the pivotable movement of the support pins between terminal positions of the support pins relative to the vehicle.

4. A motor vehicle running board assembly as claimed in claim 1 in which the support pins are releasably mounted to the clamps.

5. A motor vehicle running board assembly as claimed in claim 1 in which the ends of the running board are tapered inwardly and closed by plates secured in position.

6. A motor vehicle running board assembly as claimed in claim 5 in which the running board has upper and lower surfaces which are provided with longitudinally extending grooves V-shaped in cross-section.

7. A motor vehicle running board assembly as claimed in claim 6 in which the running board includes sockets transverse to the thickness of the board shaped to receive the ends of supporting members.

8. A running board assembly comprising:
   a running board having a hollow interior section reinforced by ribs and having a pair of sockets extending along the width thereof,
   a pair of clamps securable to a vehicle, each clamp providing an anchor post for a respective support pin mounted thereon, wherein each support pin is received in a respective socket of the running board to locate the running board, the support pins being pivotable in a plane parallel to the running board when the running board is located on the support pins, and
   a retaining mechanism constructed and arranged to selectively retain the support pins in their respective sockets.

* * * * *